US008560854B2

(12) United States Patent
Gormish et al.

(10) Patent No.: US 8,560,854 B2
(45) Date of Patent: Oct. 15, 2013

(54) DEVICE ENABLED VERIFIABLE STROKE AND IMAGE BASED WORKFLOWS

(75) Inventors: Michael J. Gormish, Redwood City, CA (US); John W. Barrus, Menlo Park, CA (US); Kurt W. Piersol, Campbell, CA (US); Richard D. Kosoglow, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 606 days.

(21) Appl. No.: 12/555,669

(22) Filed: Sep. 8, 2009

(65) Prior Publication Data

US 2011/0060910 A1    Mar. 10, 2011

(51) Int. Cl.
*H04L 9/32* (2006.01)
(52) U.S. Cl.
USPC .......................... 713/176; 713/168; 713/181
(58) Field of Classification Search
USPC .................. 713/176, 168, 181; 726/26–27
See application file for complete search history.

(56) References Cited

U.S. PATENT DOCUMENTS

| 7,397,468 | B2 | 7/2008 | Braun et al. | |
|---|---|---|---|---|
| 7,451,917 | B2 | 11/2008 | McCall et al. | |
| 7,506,809 | B2 | 3/2009 | Stoutenburg et al. | |
| 7,528,882 | B2 | 5/2009 | Saori et al. | |
| 2002/0116399 | A1* | 8/2002 | Camps et al. | 707/200 |
| 2003/0053084 | A1* | 3/2003 | Geidl et al. | 358/1.6 |
| 2006/0007189 | A1* | 1/2006 | Gaines et al. | 345/179 |
| 2007/0245227 | A1* | 10/2007 | Hyland et al. | 715/505 |
| 2008/0112615 | A1* | 5/2008 | Obrea et al. | 382/169 |
| 2008/0291129 | A1 | 11/2008 | Harris et al. | |
| 2010/0235650 | A1* | 9/2010 | Serret-Avila et al. | 713/189 |

OTHER PUBLICATIONS

"Ink Markup Language (InkML)," W3C Working Draft, W3C, Oct. 23, 2006, 61 pages, [Online] [Retrieved on Apr. 21, 2010] Retrieved from the Internet<URL:http://www.w3.org/TR/InkML/>.
U.S. Appl. No. 11/322,435, filed Dec. 29, 2005, Wolff et al.
U.S. Appl. No. 12/244,714, filed Oct. 2, 2008, Barrus et al.
U.S. Appl. No. 10/887,998, filed Jul. 9, 2004, Wolff et al.
U.S. Appl. No. 12/244,707, filed Oct. 2, 2008, Berkner et al.
U.S. Appl. No. 12/244,721, filed Oct. 2, 2008, Piersol.

* cited by examiner

*Primary Examiner* — Carl Colin
*Assistant Examiner* — John Elmore
(74) *Attorney, Agent, or Firm* — Patent Law Works LLP

(57) ABSTRACT

A system for device enabled verifiable stroke and image based workflows comprises a plurality of portable computing devices, coupled by a network to a stroke and image workflow server. The portable computing devices include a display, stroke capture capability and a wireless communication capability. The portable computing devices are adapted to receive images, add stroke annotations to the received images, and send the annotated received images. The stroke and image workflow server is coupled to the network for communication with the portable computing devices. The stroke and image workflow server sends and receives documents from the portable computing devices, maintains a log for verification, and implements a paper like workflow and processing the documents. Essentially, this stroke and image workflow server implements paper like workflow and handles the overhead of processing electronic documents so that it is invisible to the user.

20 Claims, 14 Drawing Sheets

DEVICE ENABLED VERIFIABLE STROKE AND IMAGE BASED WORKFLOWS

BACKGROUND OF THE INVENTION

The present invention relates to distributed computing systems. More particularly, the present invention relates to systems and methods for distributing processing between providers and client devices. Still more particularly, the present invention relates to distributed workflow-enabled systems that process image and stroke data to provide paper like workflows.

Much of data processing has historically been performed using paper forms and manual completion and manipulation of such forms. Paper forms are easy to use and generic ability to fill out forms is assumed in our business society, thus particular forms require no training. Paper enables flexibility by allowing free-form notation for uncertain, unclear or unusual workflows. The location of the paper form itself reflects the state of workflow progression that has been completed. Paper also provides a medium upon which unique identifiers such as signatures, comments or sketches may be added. Forms are used ubiquitously throughout most office environments and are a critical part of conventional paper-based workflows. However, such paper-based workflows are not without their disadvantages. In particular, the distribution of forms especially across large distances and distributed offices is expensive, slow and requires copying. Furthermore, the availability of the paper form is limited and the cost for storage of completed forms processed by the workflow can be expensive.

There have been attempts to overcome these disadvantages with computing devices in their various different forms. The landscape of computing devices typically available for many users has changed from a small homogeneous set of computing devices such as desktop computers coupled to a network to a large heterogeneous set of computing devices with significantly varying functionality and computational power. For example, there are any number of computing devices such as but not limited to personal computers, personal digital assistants, smart phones, laptop computers, notebook computers, e-book readers and digital cameras that are coupled for use with networks, servers and peripheral devices. While many of these devices have an ability to communicate over a network whether it be wired or wireless, their ability to interface with service providers or other peripheral devices to implement workflows is significantly limited because each peripheral device requires compliance with different data communication protocols, has its own application interface and data has to be in a format specific to that peripheral and often different from the format of other peripherals. For example, e-book readers allow content to be emailed to the device and allow the user of the device to select content and download it. These devices also allow annotations using the keyboard. However, these devices do not typically allow the input of drawings, signatures, or handwritten notes. Other devices are specially designed to capture handwritten signatures. This is common for point-of-sale terminals where a signature is used to indicate agreement to pay and delivery services where a signature is used to indicate receipt of a package. These devices typically involve training for the delivery person or cashier and use proprietary back-end systems to control what is displayed and what happens after the signature is captured. These devices typically do not provide a way to display arbitrary content and capture arbitrary annotations and deliver both to ad-hoc workflows. Other businesses use 'notebook PCs' which are essentially personal computers designed to accept input primarily from a stylus. These devices present the capabilities of a PC, with menus and file folders and arbitrary applications and try to make those capabilities easy to access with a stylus. Sometimes the user interface is customized for a particular purpose, for example, for medical charts. In this case the user does not need to learn to use a PC operating system, but must still learn the special purpose software. Such devices are typically only useful with the back-end system they were designed to be used with.

The prior art has attempted to overcome the shortcomings of paper-based form processing with e-mail based workflows. The distribution of electronic forms via e-mail has the advantage of being fast, easily replicable and deliverable in parallel. E-mail based workflows often require that the documents be e-mailed, printed, signed, scanned and e-mailed back. However, existing e-mail based workflows make it difficult if not impossible to add ink like signatures, notes and other sketches to electronic forms. Furthermore, e-mail based workflows introduce their own problems such as user level password management for secure systems. Even with such password management, a lost password leads to uncertainty for all messages in the system.

Yet another attempt by the prior art to overcome the shortcomings of paper-based form processing has been to provide centralized workflow systems. However, such centralized workflow systems often require that each user log in and require a significant amount of customized programming. Thus, even the smallest change to a workflow cannot be performed immediately. Instead a small change requires a custom modification by a skilled programmer, and typically introduces significant delay before the centralized system matches the desired workflow. Furthermore, such centralized system workflows do not accommodate arbitrary comments or modification of electronic documents. Typically such systems only provide access when a user is fully connected to the system, and users often take documents out of the central system, use a word processor to edit them and then return them to system. Such centralized workflow systems make it difficult to create ad hoc workflows or groups especially with "outsiders."

SUMMARY OF THE INVENTION

The present invention overcomes the deficiencies of the prior art with a system for device enabled verifiable stroke and image based workflows that allows the user to distribute, annotate, and collect electronic documents in a paper like manner without the end user overhead typical of dealing with personal computers. The system is particularly advantageous because it provides a mechanism to have paper or electronic documents interoperate with electronic systems. In particular, the present invention allows the display of arbitrary image content like paper and collects strokes and provides images and or strokes to the next stage of the workflow in a manner that does not require major changes to the current method of operating, and further avoids the need to print or file paper. Moreover, the interaction between the portable computing device and the server uses images, captured stroke information and structured logs to record events in a verifiable manner.

In one embodiment, the system of the present invention includes: a plurality of portable computing devices coupled by a network to a stroke and image workflow server. The stroke and image workflow server may also be coupled to data storage. In one embodiment, the portable computing devices include a display, stroke capture capability and a wireless communication capability. The portable computing devices are adapted to receive images (e.g., forms), add stroke annotations to the received images, and send the annotated received images. The stroke and image workflow server is coupled to the network for communication with the portable computing devices. The stroke and image workflow server includes a logging module, a workflow module, a verification module and a document transmission module. The stroke and image workflow server sends and receives documents from the portable computing devices, maintains a log for verification, and implements a paper like workflow for processing the documents. Essentially, this stroke and image workflow server implements paper like workflow and handles the overhead of processing electronic documents so that it is invisible to the user.

The present invention also includes a number of novel methods including a method for stroke and image based workflow processing, a method for logging compound documents, a method for verification, a method for creating a compound document and a method for determining document routing.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
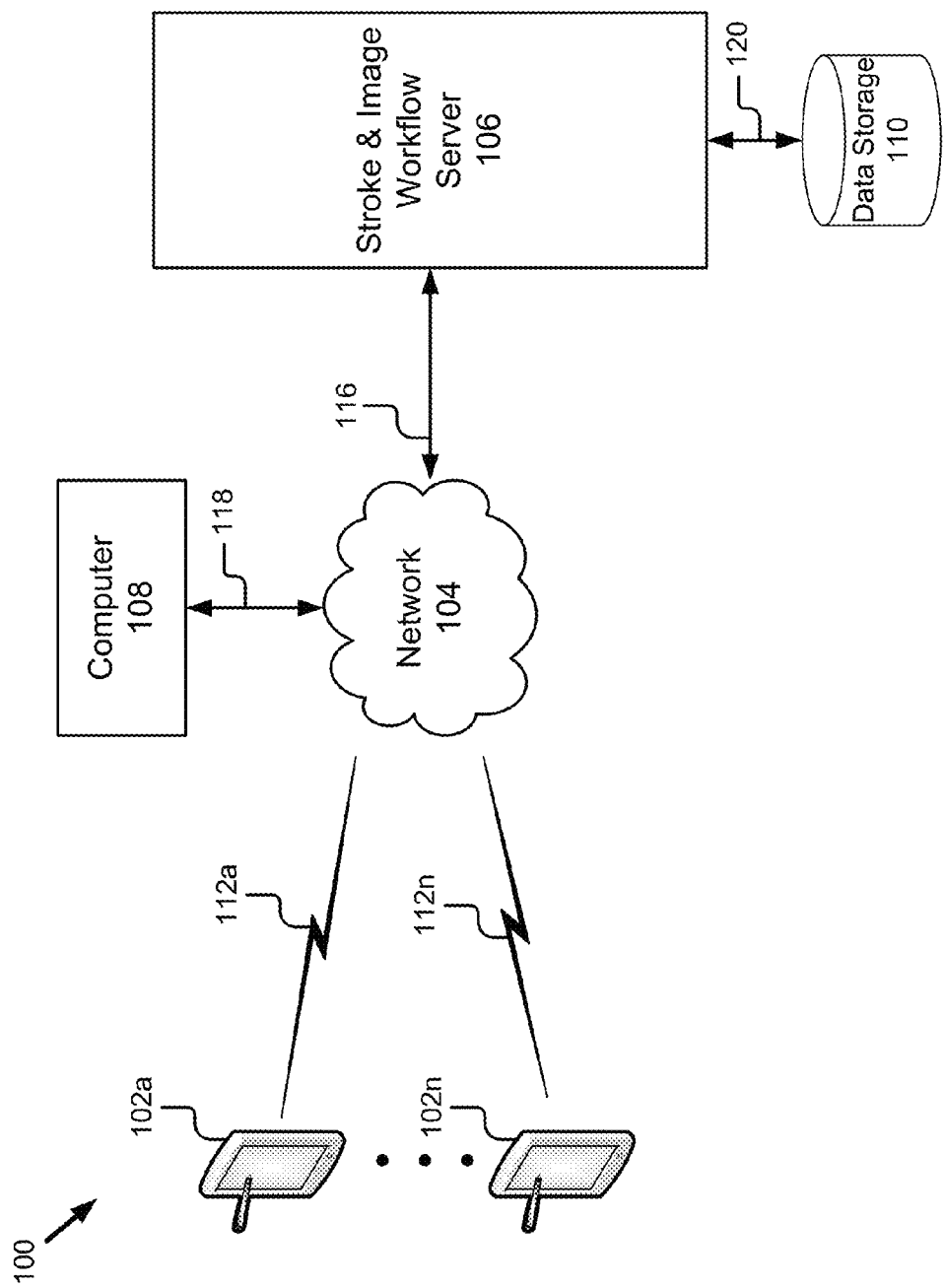
FIG. 1 is a block diagram of an embodiment of a system for device enabled verifiable stroke image based workflow configured in accordance with the present invention.

A system for device enabled verifiable stroke and image based workflow is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as Amazon Kindle. However, the present invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows an embodiment of a system 100 for device enabled verifiable stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices are adapted to receive images (e.g., forms), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 530 (See FIG. 5) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 508, a workflow module 512, a logging module 516, and a verification module 530 (See FIG. 5). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing pad 202 (See FIG. 2) may communicate with more than one stroke and image workflow server 106. Particular pages or sections of a compound document 400 (See FIG. 4) could be associated with different workflow servers. Thus the computing pad 202 might display a tax form that would be submitted to a governmental workflow server, and a medical form that would be submitted to a hospital workflow server, and a test that would be submitted to an educational workflow server when complete. The metadata directories can be used to specify the addresses for different pages or sections. Also, portions of a compound document 400 can be forwarded rather than sending the entire compound document. A student taking an exam might submit only the section with the work on the exam and not the pages with reference materials.

Portable Computing Device 102

Figure 2:
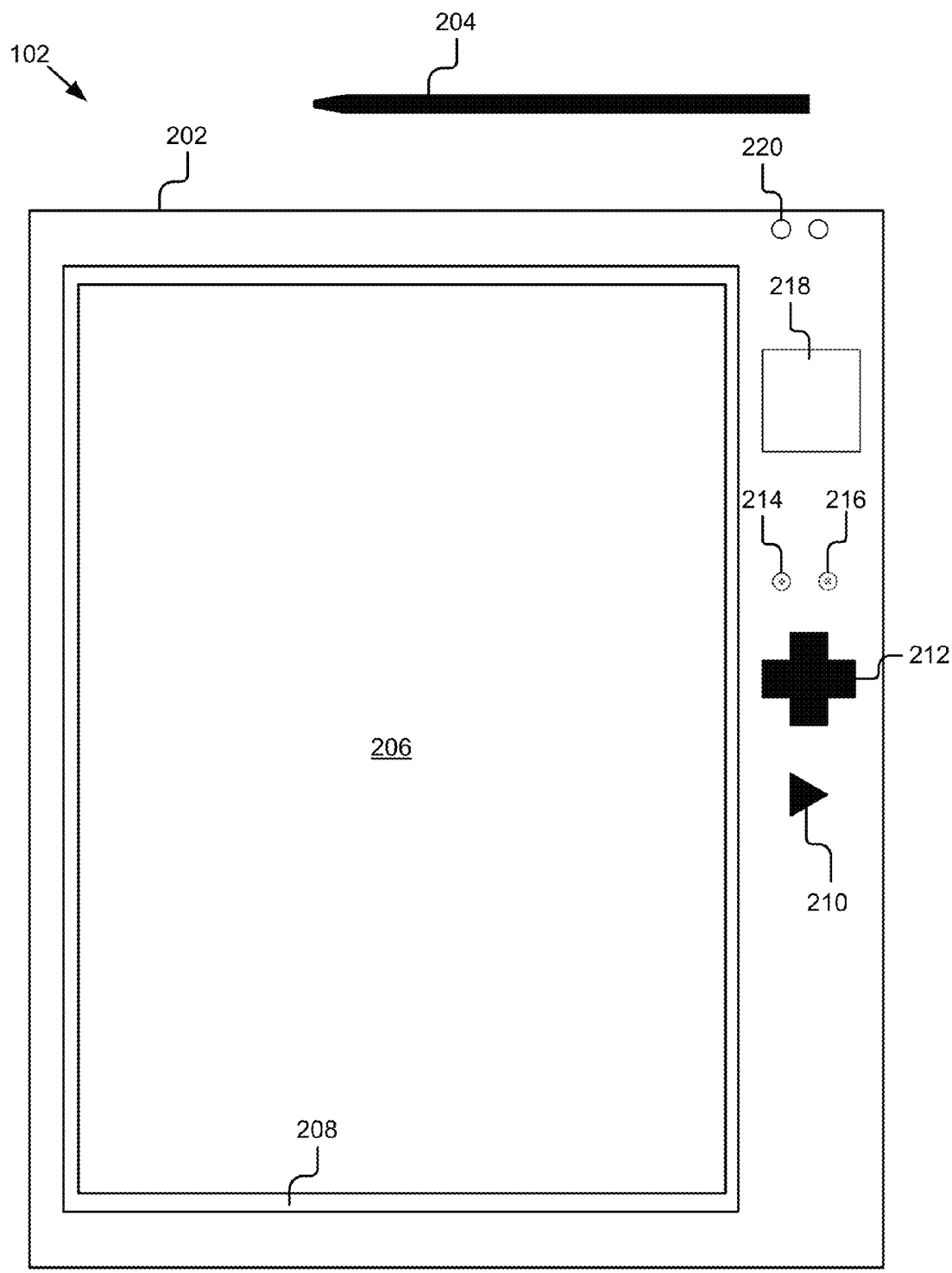
FIG. 2 is a front plan view of an embodiment of a portable computing device in accordance with the present invention.
Figure 3:
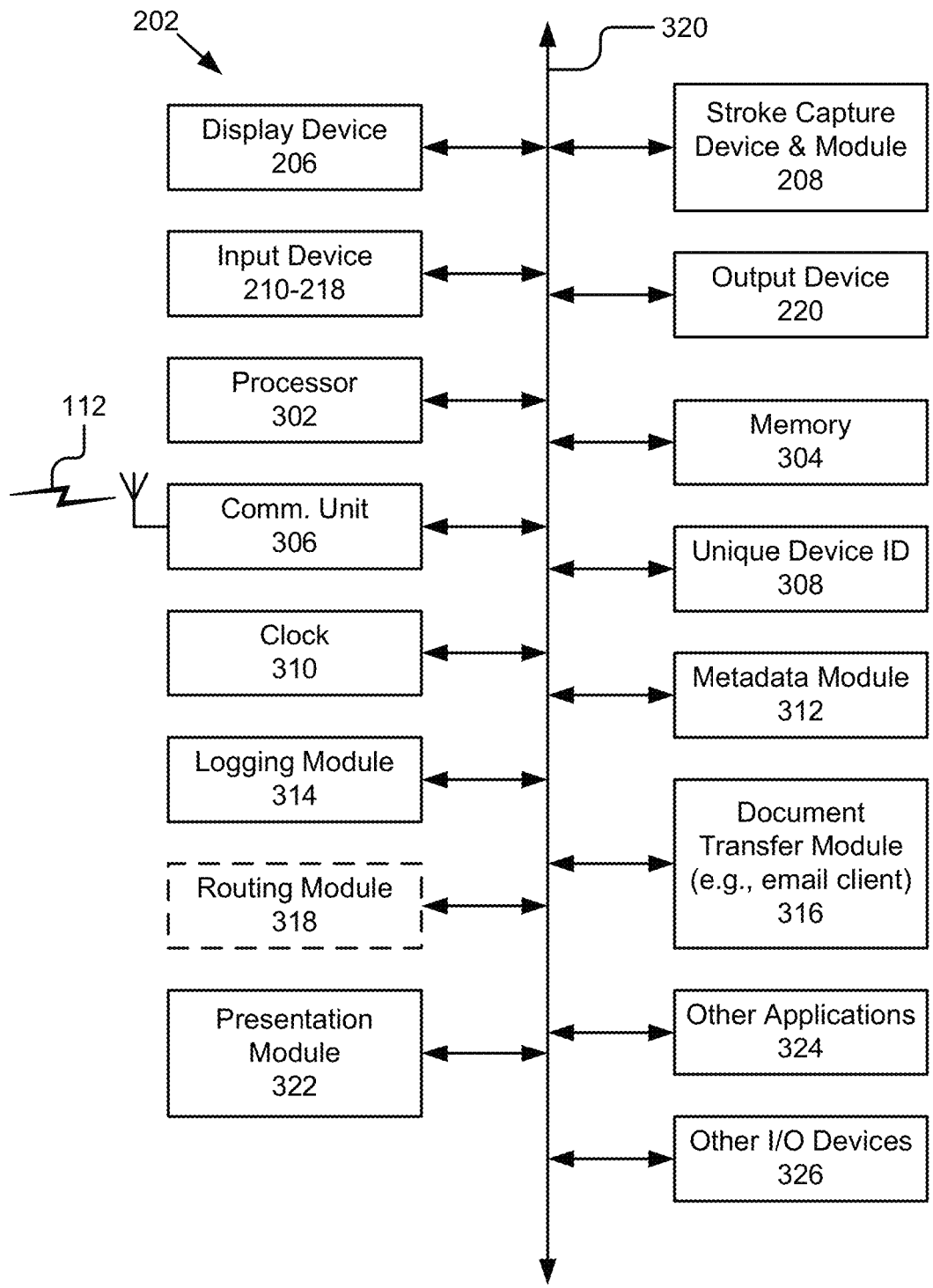
FIG. 3 is a block diagram of the embodiment of the computing pad in accordance with the present invention.

Referring now to FIGS. 2 and 3, an embodiment of a portable computing device 102 will be described in more detail. The portable computing device 102 comprises a computing pad 202 and a stylus 204. The computing pad 202 operation is to display an image and record any strokes written on the image. The strokes are typically displayed immediately on top of the image, just as if written by pen on paper. The strokes are also typically captured as a sequence of points or segments. Usually some timing information will be captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes.

The computing pad 202 comprises a display device 206, a stroke capture device and module 208, a plurality of input devices 210-216, a camera 218, an output device 220, a processor 302, a memory 304, a communication unit 306, unique device identifier 308, a clock 310, a metadata module 312, a logging module 314, a document transfer module 316, a routing module 318, a bus 320, a presentation module 322, and other applications 324.

Referring now to FIG. 2, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or an electromagnetic or light sensing devices with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. The stroke capture device 208 is either part of or adapted to communicate with the stroke capture module 208.

In addition to the stylus 204, the computing pad 202 provides a plurality of input devices 210-216 to input commands. As shown in FIG. 2, a first button 214 when selected initiates the display of a compound document on the display device 206 of the computing pad 202. A second button 216 when selected indicates that annotation is complete and the compound document should be sent by the computing pad 202. A third button 212 allows the portion of a form that is being displayed to be moved within the display area of the display device 206. This button 212 allows the user to center the form or focus on other areas of the form and center them within the display area of the display device 206. A fourth input button 210 allows the user to transition to a next page of a compound document. Those skilled the art will recognize that these input devices as buttons are merely one embodiment for the plurality of input devices 210-216 and that various other configurations of fewer or more buttons or input devices are within the spirit and scope of the present invention. More specifically, in another embodiment, the computing pad 202 has very few (or no) buttons because buttons may interfere with the device being perceived as paper-like. In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 3 buttons for forward, backward, and submit; a second example has a slider to choose a page among a large number of pages depending on the position of the finger and one or more buttons.

The computing pad 202 includes a camera 218 and an output device 220 such as a series of LEDs. The camera is a conventional type such as those available on cell phones or notebook computers. The output device 220 indicates status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a compound document and storing metadata to a compound document. In one embodiment, the metadata module 312 are instructions executable by the processor 302 to provide the functionality described below with reference to FIGS. 6A-11 for accessing both image/page metadata as well as document metadata. In one embodiment, the metadata module 312 is stored in the memory 304 and is accessible and executable by the processor 302. In any event, the metadata module 312 is adapted for cooperation and communication with the processor 320 and other components of the computing pad 202.

The logging module 314 is software including routines for creating and storing local logs in the memory 304, and more particularly, in a nonvolatile storage portion of the memory 304. In one embodiment the logging module 314 is a set of routines executable by the processor 302 to provide the functionality described below with reference to FIG. 6C then FIG. 10. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving compound documents as a formatted message from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the compound document 400 from the computing pad such as by email, file transfer, XMPP or special purpose application. In one embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 can be configured to use either. The messages might be in a format the computing pad 202 can directly use, e.g. an attachment of image files. The messages might be in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a second embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a third embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this could allow a service to transmit an image for the pad at the same time as strokes are being transmitted from the pad to server. Instant messaging protocols can also be useful if a group of computing pads 202 is sharing a display space and thus all members of the group may be informed of new strokes.

In a fourth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file.

The routing module 318 is software including routines for determining future routing of a compound document. The routing module 318 determines the next step in a workflow process and creates and sends a compound document to the location determined to be the next step in the workflow process. The operation of the routing module will be described in more detail below with reference to FIGS. 4, 6A-D and 11. The routing module 318 is coupled by the bus 320 for communication with the processor 302, the memory 304 and a document transfer module 316.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the routing module 318, the presentation module 322 and the other applications 324. There may also be a plurality of busses in computing system 202, designed to provide the most efficient communications between functional elements.

The presentation module 322 is software and routines for displaying the image portion of a compound document on the display device 206, and adjusting the display of the image responsive to input from input devices 210-216. In one embodiment, the presentation module 322 is a thin client routine executable by the processor 302 to cause display of the image on the display device 206. The presentation module 322 is coupled by the bus 320 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O Devices 326 to facilitate power systems control, as well as off-load the main processor 302 from lower-speed lesser-important tasks.

Compound Document 400 Format

The present invention utilizes a compound document 400 to provide a paper like workflow and experience for the user. In particular, the compound document format enables rapid display of images on the computing pad 202, storage of stroke data created on the computing pad 202, and storage of log information to enable verification of the operations performed on the computing pad 202. In one embodiment, the basic structure of the compound document 400 is a directory of files. Inside the directory are a series of page images, as well as optional metadata. The metadata may be associated independently with each page, and/or metadata may be associated with the document as a whole. Such metadata is stored in further nested directories, and is optional.

Figure 4:
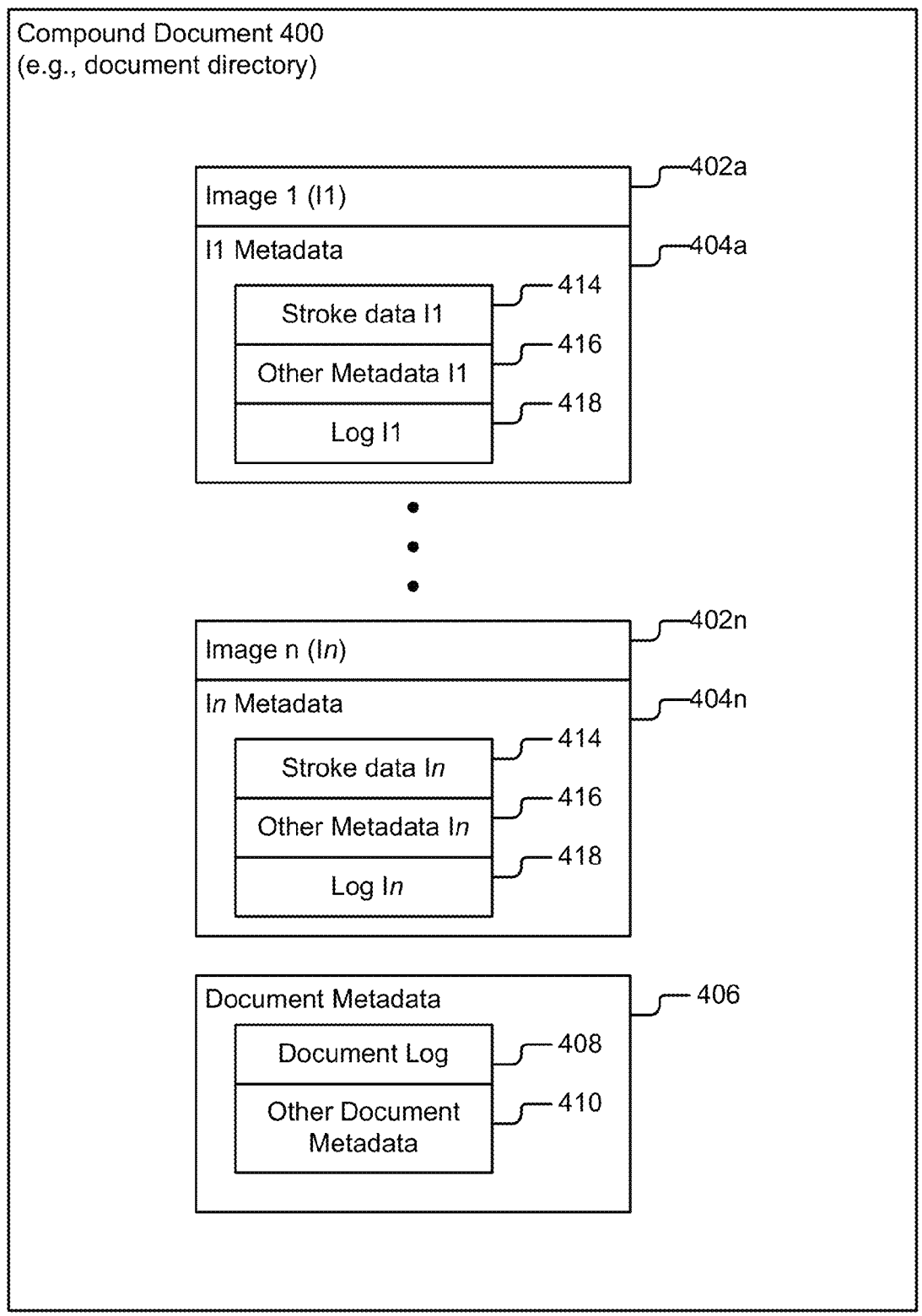
FIG. 4 is a block diagram representing an embodiment of a compound document in accordance with the present invention.

Referring now to FIG. 4, a graphic representation of the basic structure of the compound document 400 is shown. The compound document 400 as noted above is a directory including one or more files and directories. This is represented in FIG. 4 as the outermost box. In this example, the compound document 400 includes a plurality of images 402a-402n that are denoted in the figure as Image I(I1) . . . . Image n (In). The present invention advantageously stores the pages of the compound document 400 as images. This is particularly advantageous because it avoids requiring that the computing pad tool support a wide range of document formats. Providing pure images, i.e. not documents requiring rendering, to the computing pad 202 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. As will be described below, part of the process for creating a compound document 400 includes rendering documents and other formats to one of these simple image formats before the image is received by the portable computing device 102 or on the portable computing device 102. As noted above, the use of basic and simple images eliminates computation on the computing pad 202 and insures consistent display. Those skilled in the art will recognize that the compound document 400 directories can be transferred and stored as standard ZIP format archives.

In one embodiment, the mainstream pages of the compound document 400 are stored at the top level of the directory. The name segment (up to the initial ".") must be unique to that page. In one embodiment, pages are named using UTF-8. Pages may be ordered by sorting the initial name segments into ascending order, using the raw bytes of the UTF-8 representation. In some cases, applications may use document level metadata to allow reordering of pages without changing the names.

Multiple page image files which share the same initial name segment are considered to be alternate representations of the file, of equivalent quality, and the presentation module 322 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images 402a-402n may include associated page or image metadata 404a-404n. The page or image metadata 404a-404n includes stroke data 414, other metadata 416 and log data 418. Furthermore, the entire compound document 400 includes document metadata 406. The document metadata 406 includes a document log 408 and other document metadata 410.

The metadata for the compound document 400 is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. A given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "documented". This directory is included at the top level directory. It is useful to store a log of actions associated with a document in the document metadata. In one embodiment, the system 100 also stores a version of an "original" document as document metadata. For example if the compound document was formed from a PDF, Microsoft Word, Microsoft Excel or other document, the original format document may be saved in the metadata directory.

In one embodiment, the page or image metadata 404 is named with the same name segment as the page image, and ends in the extension ".d". For example, if the page image is named "page.001.jpg", the page metadata directory should be named "page.001.d" to indicate that it is associated with that page. In another embodiment, the page or image metadata 404 includes the original image in some format for each page in the page metadata directory. This metadata is created as soon as the compound document 400 is created e.g. by storing a raster format both at the top level directory and in the page metadata directory, or a copy of the original raster format may be stored when the page image is first changed. In other embodiments, the page or image metadata 404 includes log data 418 as will be discussed in more detail below. This log data 418 represents a log for changes applied to each page in the metadata directory for the page. The other metadata 416 is used to store any other data related to a particular page or image. For example, if images are added to a page, it is useful to store these added images in the page metadata directory 416. An image might be added to a page for reasons similar to "stamping" a paper page, e.g. "received" or "submitted" thus providing a visual indication of the status of the page to any reader.

The stroke data 414 stores stroke information for any strokes that are applied to a page in the page's metadata directory. This is the most important information captured by the computing pad 202. In the simplest form, a stroke is just a list of x-y locations where the stylus, pen or other pointing device, like a finger, was sensed. This information is associated with the background image that was showing when the strokes were written and it should be possible to scale and orient the strokes so that it is later possible to match what the user saw. In addition to the x-y locations, it can also be valuable to capture the time of each stroke or each point, the pressure of the stylus, which stylus was used or which end of a stylus was used (if the hardware supports this). It may even be useful to store information about the algorithm being used on the pen to convert pen strokes into pixels e.g. what width and color pen are lines being drawn in, and how are points selected between sensed points.

This information about strokes can be stored in a variety of ways. In a first embodiment, it is stored as simple text based lists comprising an x-value, a space, a y-value, and a line feed, with the end of a stroke indicated by a point outside the drawable space. For example, the pad might allow x coordinates between 0 and 1200 and y coordinates between 0 and 1600, a point recorded as "−1, −1" is not in the drawable space and can be used to terminate the stroke. In a second embodiment, strokes are stored as using a binary storage technique allocating the appropriate number of bits or bytes to each point, e.g. 2 bytes per x coordinate and 2 bytes per y coordinate, this is more memory efficient. In a third embodiment, the stroke data is stored as InkML. InkML is an XML format that allows storage of strokes and a variety of additional data, specified by the W3C and is described in the technical report, Ink Markup Language (InkML), W3C Working Draft 23 Oct. 2006. InkML allows some memory efficiency as well, and if necessary the data can be compressed by a text compressor.

Log Files 418

A particular advantage of the present invention is the ability to verify the actions performed by the portable computing devices 102 or the stroke and image workflow server 106. The ability to verify actions is enabled by the creation and maintenance of log files 418. The present invention creates a log or log file with a set of entries that describe changes made to a compound document 400. The present invention records any actions instigated by a human on a computing pad 202 which resulted in a changed appearance to the displayed document. Since the computing pad 202 is used to allow humans to write on a document as if it was paper, it is useful to record what writing was done on what pages at what time on what device and if known by whom and in what location. The present invention utilizes log files 418 with two important properties: 1) sufficient information is referenced by the log to recreate the state of the document, at minimum its visual appearance at the point of log writing and 2) the log file is "tamper evident."

The present invention generates logs that are tamper evident by maintaining a sequence of cryptographic hashes of log entries. The cryptographic hashes associated with each log entry hash data including the cryptographic hash of the previous log entry. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in co-pending U.S. patent application No. 11/322,435 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are incorporated by reference in their entirety. The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are incorporated by reference in their entirety. Thus logs containing cryptographic hashes or content based identifier (CBI) are maintained. The content based identifier (CBI) of the recent log entries are stored in other log files and published via email or other protocols. These CBIs can later be used to verify that the log was not modified since the time the CBI was published.

Maintaining logs which allow recreation of the document at any point is done by storing the type of operation performed on the document and the CBI for any data needed to redo the operation in the log file. The data itself is stored in metadata directories for the page and document.

The logging module 314 stores information about changes on a page such as: page creation, writing on a page, and adding an image to a page. The logging module 314 also stores when a page is submitted or otherwise copied from the computing pad 202 to another place. When a page is created a raster form of the image is saved in the metadata directory for the page. The page log 418 is initialized with a 'start log entry.' The start log entry includes the current time as measured on the computing pad 202 and might include a CBI from another log to establish that the page was created after the time of that CBI (this is a 'freshness hash'). In addition to the 'start log entry,' the logging module 314 stores a 'page created' entry that includes the hash of the raster form of the starting image.

If the CBI of the page log 418 is published after the page is created, then it is possible to use that CBI to check if the page log 418 has been tampered with. If the page log 418 has not been modified, then the steps in the log 418 can be followed. At first the only entry is the 'page created' entry. The CBI for the page image can be checked, and if it matches the raster image in the page metadata directory 404, then the format of the initial page is known not to have been tampered with since creation.

When strokes are added to page, they are displayed in raster format on the display device 206, and they are stored in a stroke file 414 in the metadata directory 404 for the page. A log entry is added to the page log 418, typically including the time and the CBI for the stroke file 414. Thus at a later point, if the log 418 is verified, then the stroke file 414 can be verified and the background image can be verified, if all of these items have not been modified then the stroke file 414 can be used to redraw the strokes on the background image, thus recreating the page as it looked after strokes were added.

Note that to maintain pixel accuracy, the present invention uses a known algorithm to convert the stroke file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation 'image added' and the location and scale used to add the image e.g. (500, 300) should be stored in the log 418, along with the CBI of the raster form of the image.

Many "applications" can operate on the computing pad 202 that only update pages by adding images or adding strokes. If additional changes are made to the page then log entries for these operations must be defined, the name of the operation must be stored in the log, and the hash of the data must be stored in the log. When a log entry is added to a log 418 the unique identifier 308 of the computing pad 202 is included in the entry. If a device is configured with a private key, then it might provide a digital signature of the stroke file 414 to indicate that the stroke file 414 was captured on that computing pad 202. This signature is included in the log 418.

Just as a page log 418 is created in a metadata directory 404 when a new page is created, the logging module 314 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log (along with a page identifier), the logging module 314 records just the CBI for the last entry in page log 418 when the page log 418 is updated. By storing the CBI from the page log 418 in the document log 408, the document log 408 is used to verify all the page logs 418. The CBI from the document log 408 is then published by email or other method, rather than needing to publish information from each individual page log 418.

Entries in the document log 408 are similar to the page logs 418: they should include an 'operation' and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the 'operation' is stored in a file in the document metadata directory 406 and the CBI of that file included in the log. When the 'operation' has no parameters, e.g. 'strokes added' then the same file with the text of the operation can be stored once in the metadata directory and the CBI used multiple times. Of course the CBI of the actual stroke file is expected to differ in most cases.

Stroke and Image Workflow Server 106

Figure 5:
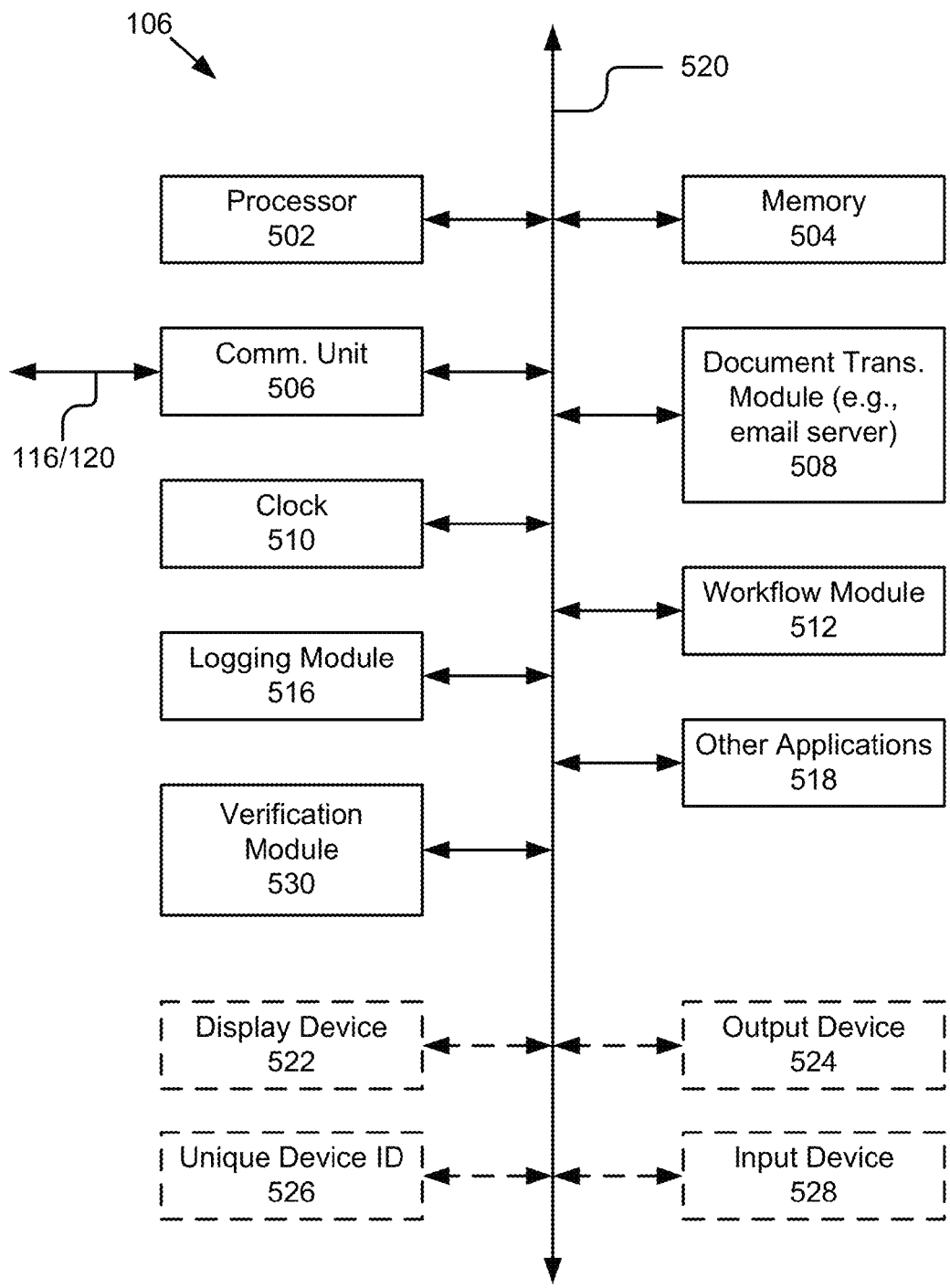
FIG. 5 is a block diagram of an embodiment of a stroke and image workflow server in accordance with the present invention.

Referring now to FIG. 5, an embodiment of a stroke and image workflow server 106 will be described in more detail. The stroke and image workflow server 106 comprises a processor 502, a memory 504, a communication unit 506, a document transfer module 508, a clock 510, a workflow module 512, a logging module 516, other applications 518, a bus 520 and a verification module 530. In an alternate embodiment, the stroke and image workflow server 106 further comprises a display device 522, an output device 524, a unique device ID storage 526 and an input device 528.

Those skilled in the art will recognize that some of the components of the stroke and image workflow server 106 have the same or similar functionality to the components of the computing pad 202 so descriptions of these components will not be repeated here. For example, the processor 502, the memory, 504, the communication unit 506, the document transfer module 508, the logging module 516, the clock 510, the other applications 518, display device 522, output device 524, unique device ID 526 and input device 528 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 506 may couple the stroke and image workflow server 106 to a network in a wired manner instead of wirelessly. The processor 502 is more computationally powerful than the processor 302 as the workflow server 106 likely services numerous portable computing devices 102. The document transfer module 508 is an e-mail server as opposed to an e-mail client. The display device 522 may be a CRT, and the output device 524 is speakers. The input device 528 includes a keyboard and mouse type controller. Those skilled in the art will recognize that there may be a variety of other differences as the components of the stroke and image workflow server 106 acts as a hardware server as opposed to a remote client.

The verification module 530 of the stroke and image workflow server 106 is software and routines for verifying the processing of a compound document 400. In one embodiment, the verification module 530 is routines executable by the processor 502 to perform verification of document processing as described below with reference to FIG. 6D. The verification module 530 is coupled by bus 520 to the processor 502, the memory 504 and the communication unit 506. Note that the verification module 530 might be used independently of the stroke and image workflow server 106. In fact, it might run on the computer 108 for independent verification of documents without need to trust a particular server.

The workflow module 512 of the stroke and image workflow server 106 is software and routines for processing and routing compound documents. The workflow module 512 creates compound documents 400 and creates formatted messages. The workflow module 512 also works with the logging module 516 to create a system log (stored in the logging module 516, the memory 504 or the data storage 110) and publishes or makes available that log as needed. The workflow module 512 is also responsible for routing formatted messages on to the next location as part of a processing workflow. In one embodiment this function is provided by the routing module 318 of the computing pad 202. In another embodiment, the computing pad 202 sends reply emails to the stroke and image workflow server 106, and the workflow module 512 determines the routing and next workflow step. It should be noted that the process of creating a system log by the workflow module 512 can create a log entanglement as noted above, and that the presences of multiple workflow modules 512 servicing distinct pages of the document greatly increases the difficulty of tampering with the document without being detected.

Workflow Specification

Depending on the embodiment, much of this functionality is performed either by the workflow module 512 of the stroke and image workflow server 106 or by the routing module 318 of the computing pad 202. For convenience and ease of understanding, it is described below as being performed by the routing module 318 of the computing pad 202; however, those skilled in the art will recognize that alternatively the same operations may be performed by the workflow module 512 of the stroke and image workflow server 106.

Those skilled in the art will recognize that there are a variety of ways that the routing module 318 of the computing pad 202 determines what to do with the strokes recorded on a page and when these strokes should be submitted to the next step in a workflow. How the routing module 318 of the computing pad 202 handles a completed page depends on how the pad is configured and how the page information was received.

In one embodiment, computing pads 202 are configured to work with a particular stroke and image workflow server 106 and submit a page to the stroke and image workflow server 106 for that page, the stroke and image workflow server 106 then determines the next step based on preprogrammed rules.

In another embodiment, workflows are specified in the compound document 400 or in the email (formatted message) in which the compound document 400 was sent. In the simple case of receiving a compound document 400 by email, the computing pad 202 returns the completed compound document 400 by email to the sender of the compound document 400. A better practice is to send the compound document 400 to the address specified in the "Reply-To:" email header if one is provided, just as would happen if "Reply" was selected in typical email clients. Most email clients enable the sender to specify a "Reply-To" address. This allows one person to fill out a form and send it to a different computing pad 202 with the "Reply-To" header set to the next person/device/location that should see the compound document 400 after it has been approved by the user of the computing pad 202. For example, an employee can fill out a travel request form, email the form to their manager's computing pad 202, with the reply-to set to the travel coordinator. If the manager approves the travel request and submits the form, it will automatically be routed to the next step without any need for the next email address to be entered on the computing pad 202.

The use of the "Reply-To" header allows one step of the workflow to be done without the need to enter an email address. To allow more than one step workflows, additional mail headers could be defined. For example an email might include headers as follows:

X-Workflow-1: manager_pad@example.com
X-Workflow-2: director_pad@example.com
X-Workflow-3: vp_pad@example.com
X-Workflow-4: travel_arrangements@example.com, employee@example.com In this multiple step workflow embodiment, the computing pads 202 are configured to examine email headers for workflow steps, determine the current step, and when the form is completed forward it, with all workflow email headers to the next step. The example above allows multiple computing pads 202 to be used to collect document signatures, and then the signed form is sent to someone to arrange for travel and also back to the employee who started the workflow. This allows the employee to have a copy and know when the travel has been approved. The employee could list their address at every step as a way to track the form. In some cases, such as a survey or test, the same form should be sent to several people, different answers collected and the results accumulated or processed. For example an instructor might prepare a compound document with examination questions and email it to the computing pads 202 of all the students in the class. Each student might receive the form with the "Reply-To:" header set to the instructors address. Thus when a student finishes the exam the instructor receives it. The instructor will also receive the time for all of the strokes.

A computing pad 202 or other device determines its stage in the workflow by searching for the occurrence of its own email address in the list. To deal with workflows that require review more than once by the same person it may be possible to determine which stage from the message-id headers. Alternatively, an additional email header is used listing the completed workflow steps, e.g. "X-Workflow-Completed: 1, 2." In this case, when each stage of the workflow is finished that stage is added to the email header and forwarded.

The email headers list above can include web services in addition to computing pads 202. For example, after the compound document 400 is viewed and signed by the computing pad 202 with the email address "manager_pad@example.com" it is sent to a signature verification service. This service might examine the strokes and determine if an appropriate manager had signed the document, and if so, attaches some metadata indicating that the signature had been verified. In one embodiment, the service is provided via the stroke and image workflow server 106. In other words, the e-mail is sent to the stroke and image workflow server 106 which in turn sends the compound document 400 to the service for verification.

In one embodiment, the formatted message used to send the compound document 400 includes parameters in the email headers for either the computing pad 202 or for a workflow service. For example, if strokes are sent to a handwriting recognition service, it might be useful specify a language, or to indicate that some of the strokes are 'numeric' rather than arbitrary characters. The following is one example of email headers indicating a workflow with a computing pad 202 and a service:

X-Workflow-1: manager_pad@example.com
X-Workflow-2: mark_recognition@example.com
X-Workflow-2-parameters: language=English & marks=true In this example, the parameters are attribute-value pairs and here specify that the language is English and the strokes as including numeric characters.

In some cases a compound document 400 does not continue to the next step of a workflow, perhaps because the request is denied, or more commonly because more information is required. In one embodiment, additional headers are defined to deal with multiple paths through a workflow, although a form or the computing pad 202 would need to have ways to indicate which path to take. For simple linear workflows forms will either go to the next step or be rejected. Rejected forms can be returned to the sender, perhaps with additional annotation as to why they were rejected. For example, one user may circle an unfilled out region of a form and cause it to be sent back to the previous step.

Thus the computing pad 202 or form should provide means to indicate 'submission' of a form to the next step, and 'rejection' or a return to the previous step. In a linear workflow (one with only one path), specified by the 'X-Workflow-*' headers illustrated above, the 'X-Workflow-Completed:' header can be changed to indicate the previous stage was not really committed. For example, if the headers were:

X-Workflow-1: manager_pad@example.com
X-Workflow-2: director_pad@example.com
X-Workflow-3: vp_pad@example.com
X-Workflow-4: travel_arrangements@example.com, employee@example.com
X-Workflow-Completed: 1, 2

And the email was received by the "vp_pad@example.com". The user of that computing pad 202 could reject the form, perhaps by writing a note 'needs cost estimate' and indicating rejection. The metadata module 312 then changes the 'completed' line removing the last value, so that it now reads: "X-Workflow-Completed: 1" and sending the document to the next required step. In this case, step 2, director pad example.com.

In an alternate embodiment, HTTP headers could be used instead of or in addition to e-mail headers. If the compound documents are transported by HTTP, similar information is inserted to support multiple steps in the HTTP headers. In this case, the next step might be a URL to deliver the document to rather than an email address. For example, there might be a line like: "X-Workflow-4: http://www.example.com/travelrequest.cgi" in the email header. In this case, when step 3 is complete instead of using email protocols, the current compound document 400 is sent via an http post command to the URL in the workflow step. Of course if HTTP is being used for document transport, in one embodiment, the formatted message including the compound document 400 is returned to the stroke and image workflow server 106 before being sent to the next stage. This allows the stroke and image workflow server 106 to keep track of the status of the workflow, and allows integration with a content management system or other line of business application.

If the documents are being transported in a manner that supports page images, strokes, and metadata, then the metadata can contain the workflow instructions and status. Again, in the simple case, the metadata includes a list of email address and the current step of the workflow. For the compound document 400 described above, this workflow information could appear in a page metadata directory 404 or a document metadata directory 406.

Methods

Figure 6A:
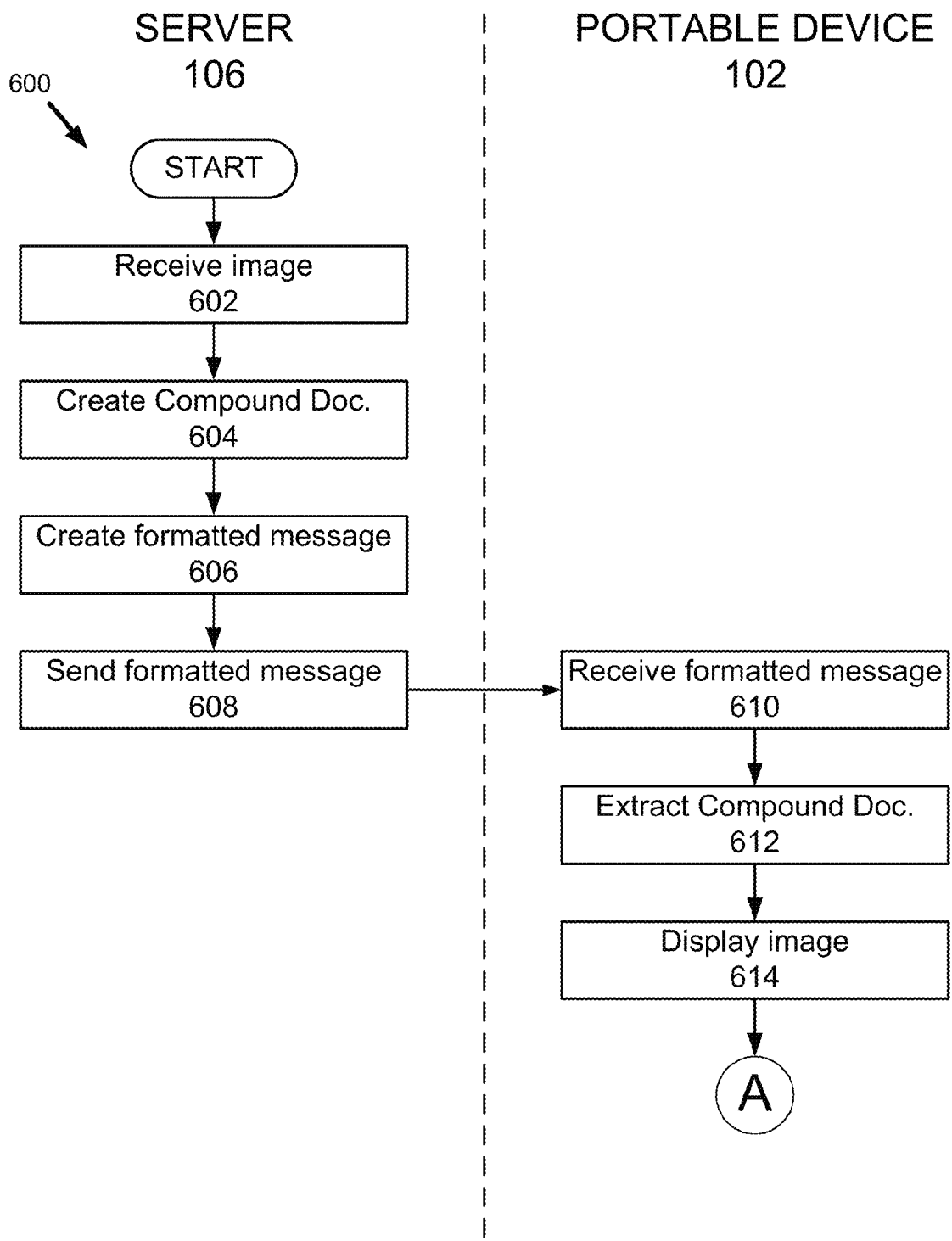
FIGS. 6A and 6B are flowcharts of an embodiment of a method for stroke and image based workflow processing in accordance with the present invention.
Figure 6B:
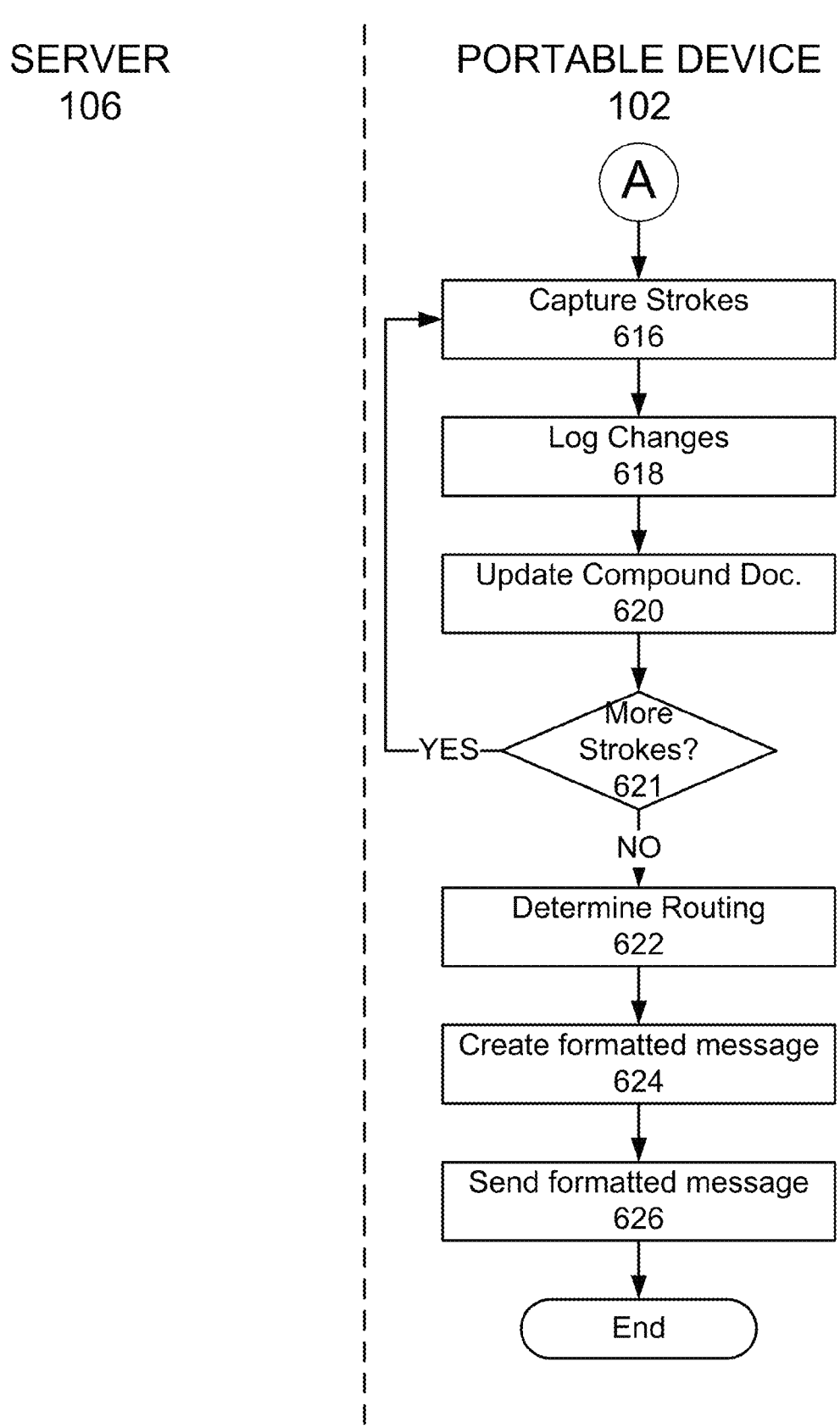

FIGS. 6A and 6B are flow charts of a general method for stroke and image based workflow processing in accordance with the present invention. Referring now to FIG. 6A, the method 600 will be described. The method 600 begins when the stroke and image workflow server 106 (hereafter "server 106") receives 602 an image or group of images. The server 106 then creates 604 a compound document 400. The compound document 400 includes images and metadata as have been described above with reference to FIG. 4. Next the server 106 creates 606 a formatted message. As described above, in one embodiment a formatted message is an e-mail that includes the compound document as an attachment and an e-mail header that specifies the workflow. Next, the server 106 sends 608 the formatted message to the first device specified in the workflow. For example, the server 106 sends 608 the formatted message as an e-mail to the first e-mail address specified in the e-mail header, the document metadata 406 or page metadata 404. Those skilled in the art will recognize that in an alternate embodiment steps 602-608 could be performed by a portable computing device 102 adapted with the functionality to create compound documents 400.

Next, the portable computing device 102 receives 610 the formatted message. Then the portable computing device extracts 612 the compound document 400 from the formatted message. For example, the formatted message is an e-mail message including a WinZip file with a directory, subdirectories and image files. The WinZip file is extracted from e-mail message and the result is the directory, subdirectories and image files. The portable computing device 102 next uses the presentation module 322 to display 614 the images to the user. Referring now also to FIG. 6B, the method continues with the portable computing device 102 capturing 616 strokes as the user moves the stylus or finger over the display device 206. The log module 314 logs 618 the changes and processes the strokes as has been described above, and updates 620 the compound document 400. For example, the log module 314 updates 620 the page log 418 and the document log 408 after a pen-up gesture. Next the method determines 621 whether additional strokes are received at the portable computing device 102. This is determined by either a timeout or input from the user indicating that annotation of an image is complete. If there are more strokes to the input, the method returns to step 616 and repeats steps 616 through 621. If there are no additional strokes to be input, the method continues by determining 622 the routing for the updated compound document 400. In particular, the routing module 318 of the portable computing device 102 determines the routing by examining e-mail headers as has been described above. Next, the portable computing device 102 creates 624 a formatted message including the updated compound document 400. The general process is completed with the portable computing device 102 sending 626 the formatted message created in step 624 to the next workflow recipient in the workflow process. Those skilled in the art will recognize how the process described above with reference to FIGS. 6A and 6B is repeated any number of times as the formatted message and compound document transition between any number of portable computing devices 102 and the server 106. Those skilled the art will also appreciate that in certain circumstances the server 106 may be less involved and the formatted messages are sent via the network 104 and conventional e-mail servers between different portable computing devices 102 representing different steps in the workflow.

Figure 6C:
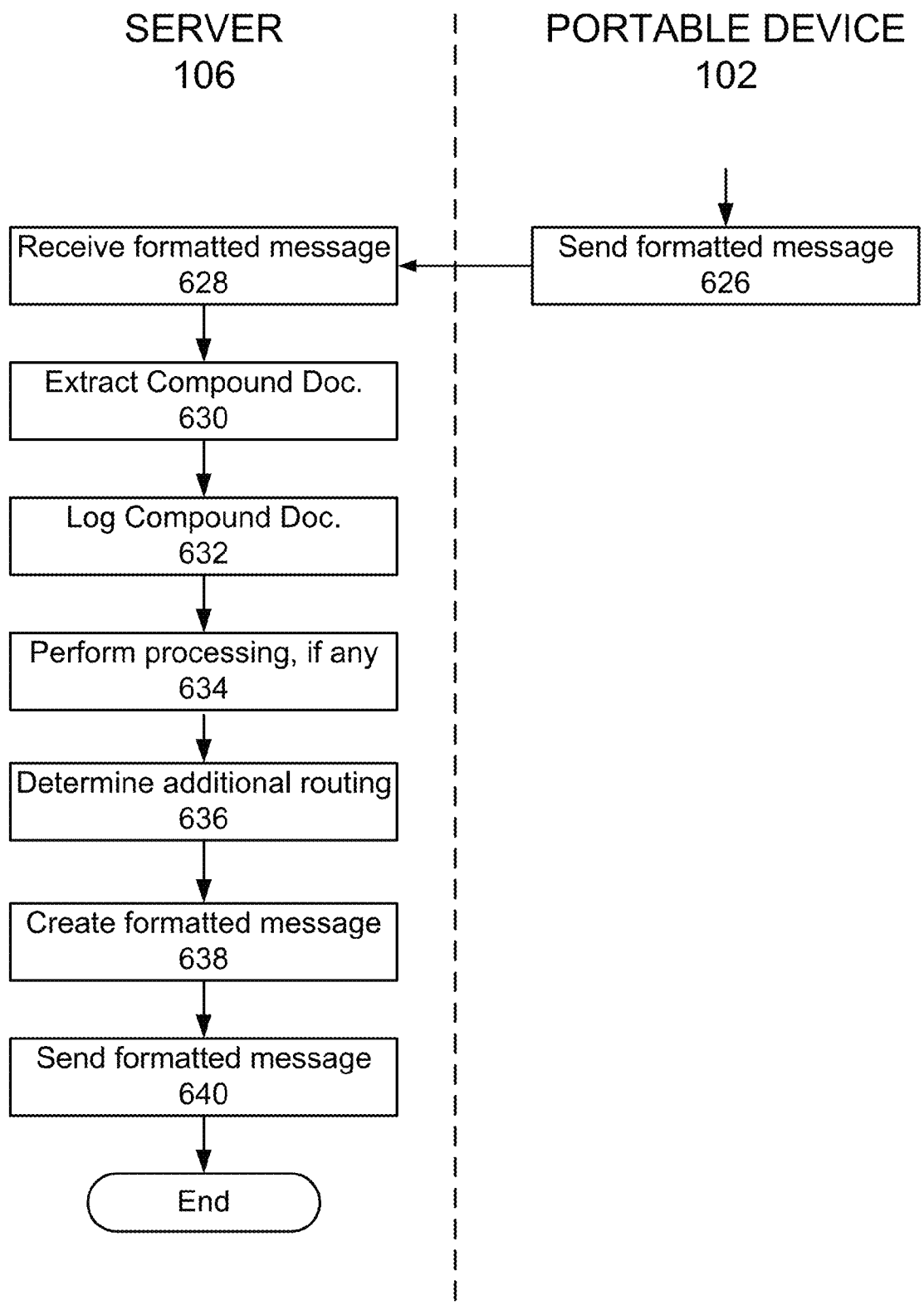
FIG. 6C is a flowchart of an embodiment of a method for logging in a stroke and image based workflow in accordance with the present invention.

Referring now to FIG. 6C, one embodiment of a method for logging activity in a stroke & image based workflow is described. For example, rather than terminating after step 626, the process continues at the server 106. In this embodiment, the server 106 maintains and publishes a log of steps as they are performed for a given workflow. This log can later be used for verification. This is accomplished by having the formatted message or a copy of it transmitted to the server 106 after each processing step. The logging begins with the receipt 628 at the server 106 of the formatted message. The server 106 then extracts 630 the compound document 400 from the formatted message received in step 628. The compound document 400 is then logged 632 at the server 106. For example, the logging module 516 stores a copy of the compound document 400 and its associated metadata along with a timestamp of when the formatted message was received. Next, the server 106 performs processing 634 if any, associated with the server 106 being the recipient of the formatted message. For example, if the formatted message was sent to the server 106 to access the service, the server 106 sends the appropriate portions of the compound document 400 to service providers for processing, receives the results and updates the compound document 400. Various examples of services such as text recognition, signature verification, etc. have been described above. Next, the method determines 636 any additional routing for the formatted message. As has been described above, the e-mail header of the formatted message is examined to determine the next step in the workflow process. Next the workflow module 512 of the server 106 creates 636 a new formatted message with the next destination in the workflow as the addressee of the message. Then the formatted message created in step 638 is provided to the document transmission module 508 of the server and is sent 640 via the communication unit 506.

Figure 6D:
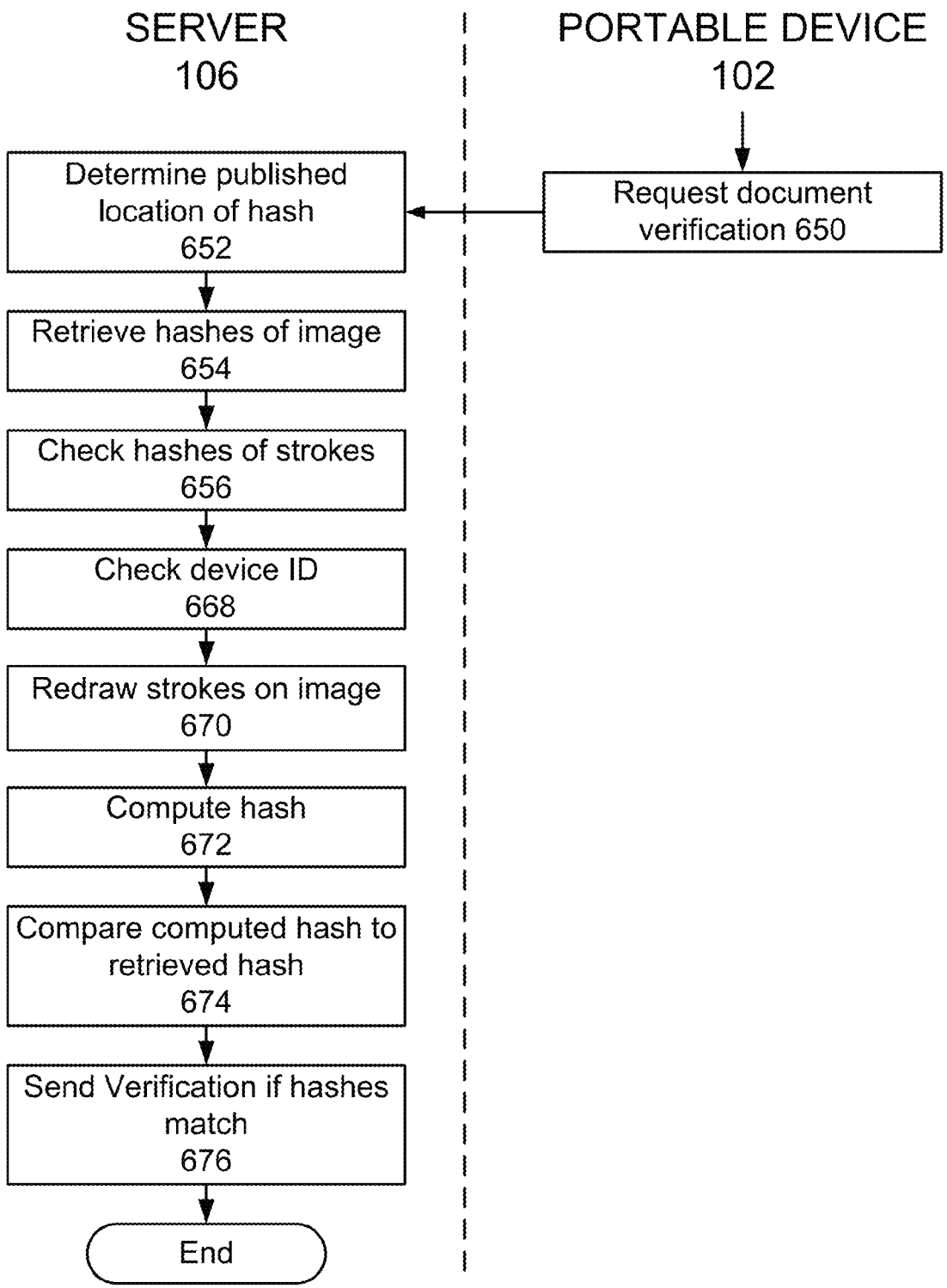
FIG. 6D is a flowchart of an embodiment of a method for verification in a stroke and image based workflow in accordance with the present invention.

Referring now to FIG. 6D, an embodiment of a method for performing verification is described. The process begins with a request 650 for document verification. While this is shown as being initiated at the portable computing device 102, those skilled the art will recognize that the verification requests could be generated and sent from the server 106, the computer 108 or any one of the portable computing devices 102*a-n*. The request is received at the server 106 and the server determines 652 the published location of a hash value for the compound document 400. Next, the server 106, in particular, the verification module 530 retrieves 654 the hash values for the images in the compound document. Next the verification module 530 checks 656 the hash values of the strokes and retrieves the stroke values from the stroke data 414 of the compound document 400. Then the server checks 668 the device ID to ensure that the device ID is valid. Next, the server 106 redraws 670 the strokes on the image, and computes 672 a hash value for the image and the redrawn strokes. In order to verify the document, the server 106 compares 674 the computed hash values to the retrieved hash values for a match. If the hash values match, the server 106 sends 676 a verification message to the device that requested verification. If the hash values do not match then a message that the compound document 400 is not valid or no confirmation message is sent. Those skilled the art will recognize that the various steps of FIG. 6D may be performed in an order different than that shown. Hashes of raster images may fail to verify because of minor differences in rendering techniques. In this case, the raster image can be retrieved from the portable device log, the hash of that image can be verified to be in the log, and then the raster images can be compared. If the raster images are close enough, a confirmation can be sent. Close enough can be defined in a variety of ways including mean squared error, or analysis by a human observer.

Suppose a form is received that was signed on a computing pad 202, and someone suggests that the signature was just copied from another document and applied to the current form. The logs 408, 418 stored in the compound document 400 are examined to determine what order the signature or other strokes were applied in, and when the signature was made. If the CBI for the log was published in a timely manner, then it is possible to know that the signature was applied before the time of publication. If the portable computing device 102 signed the stroke file with a digital signature then it is possible to confirm that the strokes were added on a particular portable computing device 102, and this removes the opportunity for someone to have added the strokes that didn't have access to the portable computing device 102. Alternatively, if the portable computing device 102 published the CBIs of the signature strokes, then even without a digital signature one can be confident that the strokes were added by the same portable computing device 102 on which other signatures were added. For signature verification purposes, the timing of individual strokes could be analyzed as well, using the time information stored in each stroke. Also a service might use the stroke information in real time to access a signing service which accepted strokes, verified their likely authenticity, and then apply a digital signature to supplement the stroke based signature.

Figure 7:
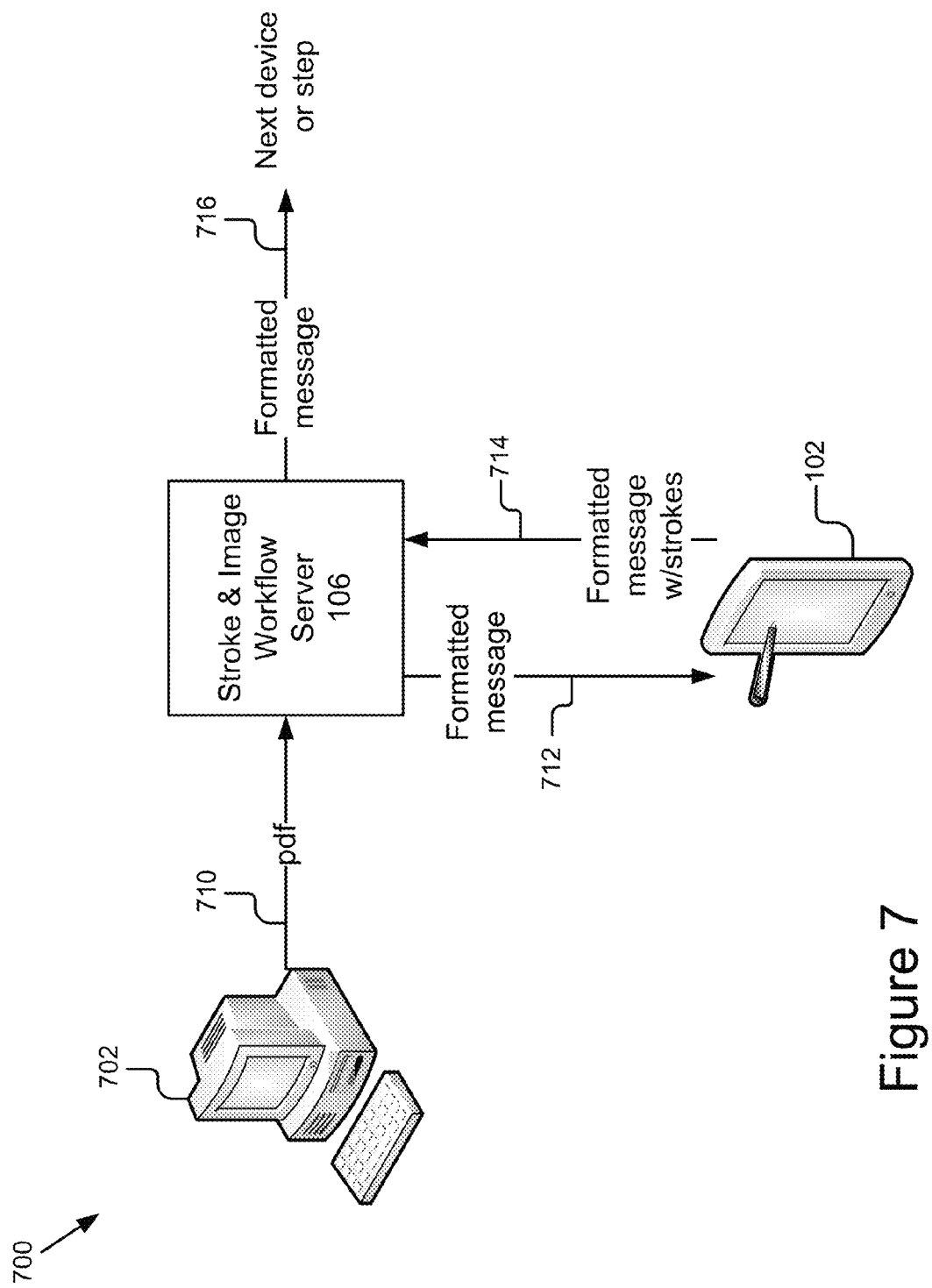
FIG. 7 is a block diagram of an embodiment of a system for signing forms in accordance with the present invention.

Referring now to FIG. 7, one example usage scenario for signing forms in accordance with the present invention will be described. FIG. 7 illustrates an example system 700 in which a computer 702 generates an image and sends 710 it to the stroke and image workflow server 106 for further processing. Part of this process includes obtaining a digital signature of an individual that has access to the system 700 via a portable computing device 102. The portable computing device 102 acts as a personal signing device for the user for any image and stroke based worked flows.

For example, the portable computing device 102 is configured to have a unique email address such as barrus_pad example.com. Note that there is an advantage to having this email be different from the user's primary email address, e.g. barrus@example.com, so that only messages intended for processing on the portable computing device 102 are displayed on the portable computing device 102.

As shown in FIG. 7, a coworker at a personal computer 702 has a document in PDF form that requires approval by the user of the portable computing device 102. This coworker sends 710 a message including the PDF to the address associated with the portable computing device 102. The formatted message is initially stored on the stroke and image workflow server 106, the mail server associated with that email address; and when the portable computing device 102 is connected to the network 104 it can access 712 the formatted message and display it to the user. The user might fill out some portions of the form, or might sign the document, or both. Then the user indicates that he is done with the form, at which point the formatted message with strokes is sent 714 to the outgoing mail server of the portable computing device 102. The formatted message with strokes message might then be returned as a pdf file to the initial sender, or it might be forwarded 716 as a formatted message to another step in the workflow process.

This is particularly advantageous because extremely simple and limited capability devices (E.g., portable computing devices 102) can be used for this workflow. The mail server (document transfer modules 316, 508) for the portable computing devices 102 are configured to do any necessary file conversion. Rendering PDF files is computationally intensive and as different features are used in PDF files the software needed to display the files may change. However, if the rendering is done on the server 106, a portable computing device 102 need only support a single image format appropriate for its display.

In an alternate embodiment, the portable computing device 102 need only return strokes to the outgoing mail server 106, along with an indication of the document to which the strokes apply. The outgoing mail server 106 converts the strokes back into the original document format, e.g. a PDF file. Portable computing devices 102 which depend on the incoming and outgoing servers for conversion and other computation will require fewer software upgrades than devices that perform all document conversions locally.

Extremely simple user interaction is possible on the portable computing device 102, in part because of the limited expectations. If the portable computing device 102 is used solely to display documents ready for signatures or simple stroke based mark up, there is no need for the user to learn a complex user interface. The portable computing device 102 must be configured which might happen using a PC or might be done by someone other than the end user. Given a configured portable computing device 102, which automatically checks for email, the users need only learn how to change pages forward and backward, how to write, and how to submit a completed form.

Figure 8:
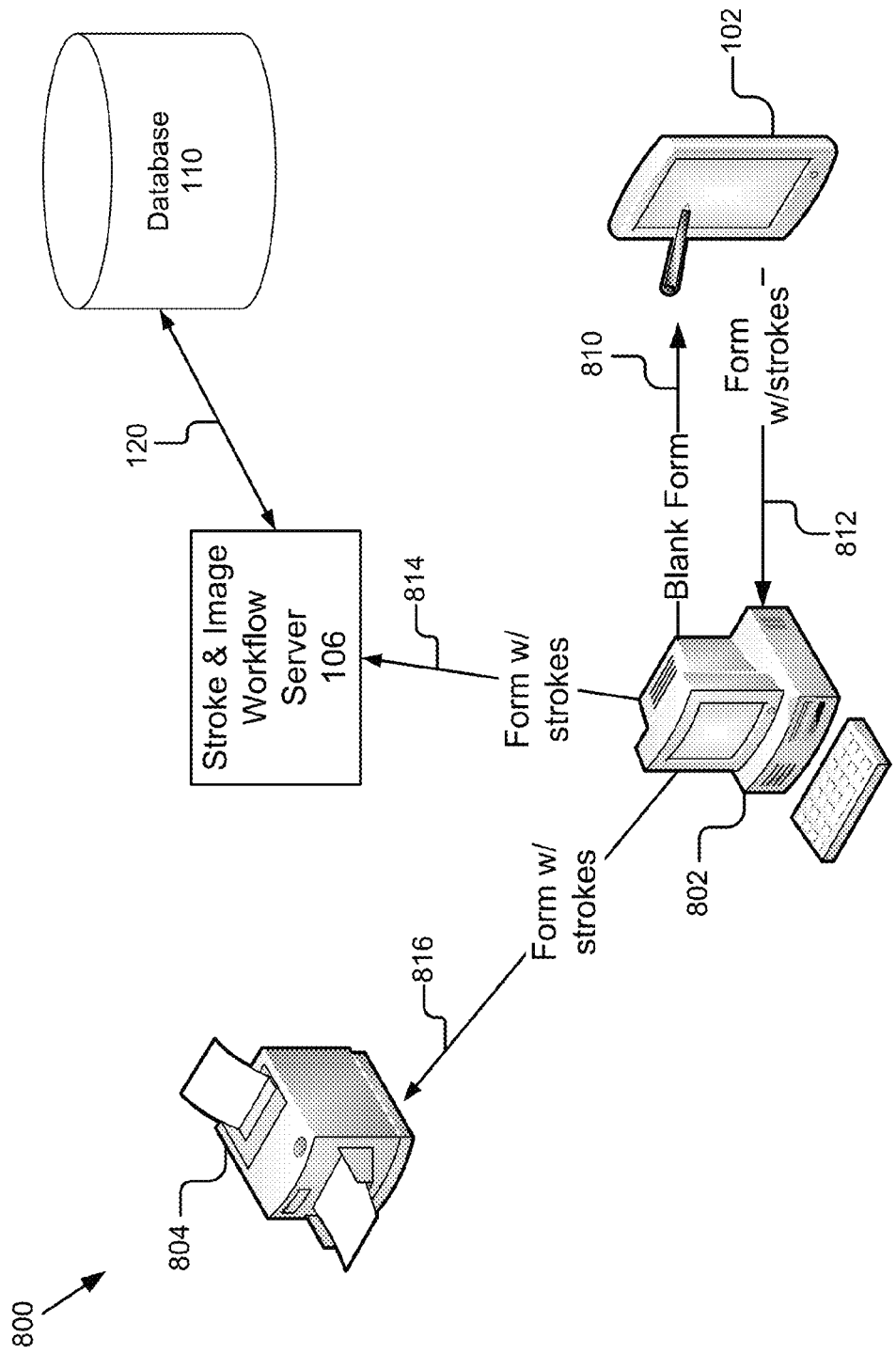
FIG. 8 is a block diagram of an embodiment of a system for patient records in accordance with the present invention.

FIG. 8 is a block diagram of another embodiment of a system 800 for processing records in accordance with the present invention. The system 800 could be used for processing patient records and medical practitioner's office or configured as a departmental in-basket to capture strokes and send forms to next workflow step. The system 800 of FIG. 8 includes a computer 802, a printer 804, the stroke and image workflow server 106, one or more portable computing devices 102 and the database 110. The computer 802 is wirelessly coupled to the portable computing device 102 to send 810 blank forms and receive 812 forms with strokes. The computer 802 is coupled 816 to the printer 804 to print the forms with strokes. The computer 802 is also coupled to the stroke and image workflow server 106 to provide 814 forms with strokes. The stroke and image workflow server 106 is coupled by signal line 120 to the database 110 as has been described above.

In one embodiment, the computing pad 202 is associated with a job task or group of people rather than a person. If multiple people are capable of processing an expense report, for example, then the email address of the computing pad 202 is configured as expense reports example.com. A single device then serves as a replacement for the paper "in basket" where anyone could drop off a form and different people might pick the form up and process it. Anyone can email to the computing pad 202, and anyone capable of signing off on the form can pick-up the computing pad 202 and approve or otherwise process the form. If multiple devices are used then they access the same email address, and display the forms sent to that address. Then when any one person approves or otherwise 'completes' the form it can be sent on to the next step of processing. The form is marked as completed on all the devices or removed from the devices. Thus the devices may easily be used to distribute work without duplication of paper or effort.

In another embodiment, the computing pad 202 may be configured to support typical patient interactions in a medical office. A typical interaction in a dental office includes a patient arriving, being greeted by a receptionist and given a clipboard and asked to update their health history. The patient fills out this form and returns the clipboard to the receptionist and then waits to be seen. A first-time patient may be given a more extensive form. To support this interaction, the receptionist might run an application on his computer 802 that allows the selection of a form to copy to the computing pad 202. This might be a totally blank form, or the form might be filled in with the patient's name and other information from the scheduling system e.g. the name of the doctor the patient will see. As shown in FIG. 8, the receptionist causes a form to be loaded on the computing pad 202 and gives the computing pad 202 to the patient. The patient uses a stylus to provide information on the form. The patient indicates the form is complete by pressing a button, making a special stroke, or simply by returning the computing pad 202 to the receptionist. The receptionist using the same computer 802 or application then prints the form to be used in a paper based workflow or uploads the form to some patient records system, or a recognition system.

Figure 9:
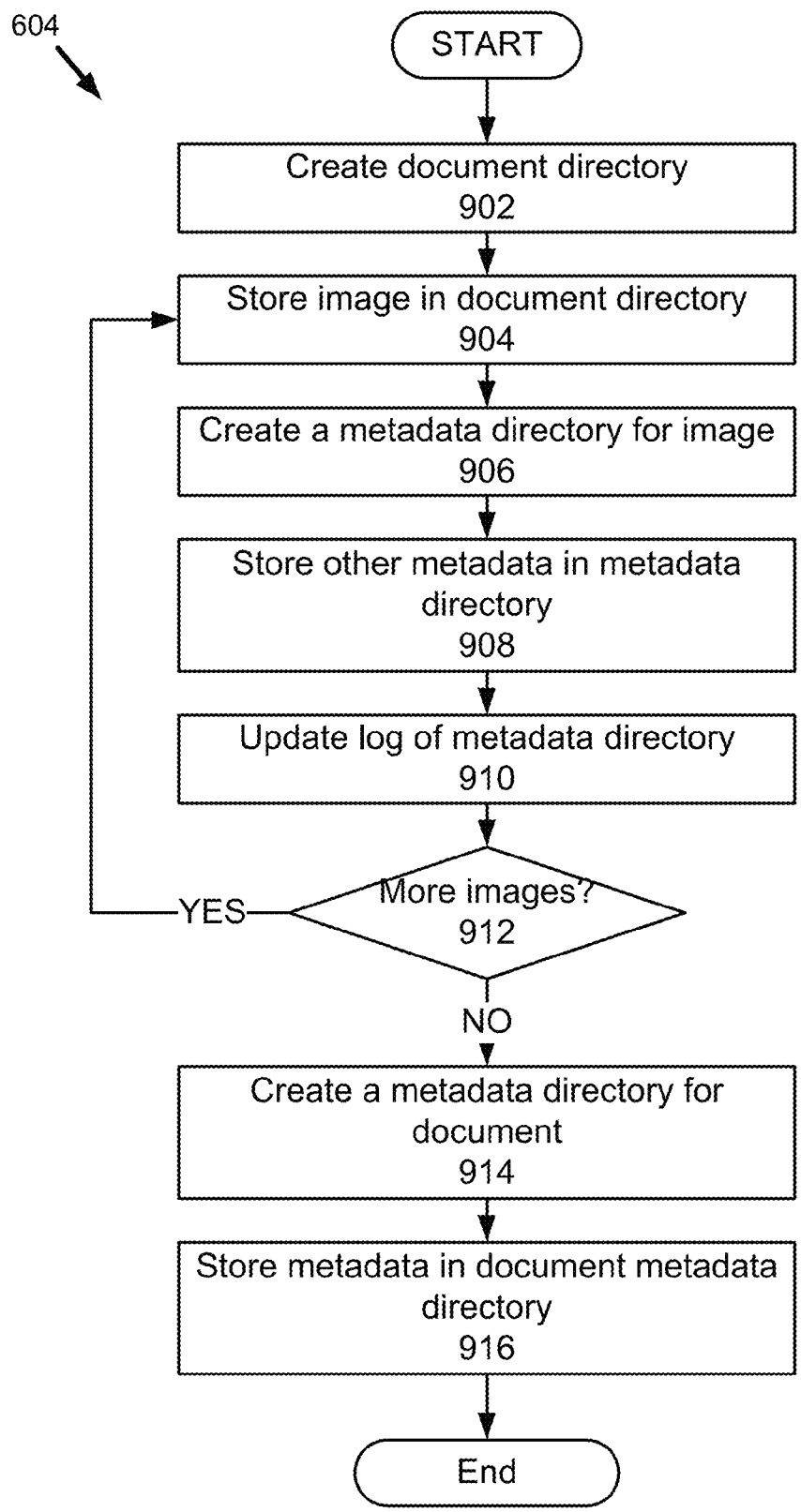
FIG. 9 is a flowchart of an embodiment of a method for creating a compound document in accordance with the present invention.

Referring now to FIG. 9, one embodiment of a method for creating 604 a compound document 400 is described. The method for creating 604 the compound document 400 will be described as being performed by the stroke and image workflow server 106; however, those skilled in the art will realize that in alternate embodiments other devices could also perform this method of creating the compound document 400. The method for creating 604 a compound documents 400 begins by creating 902 a top-level document directory. Next, the server 106 stores 904 an image in the document directory. As has been noted above, the file names for the images stored in the document directory preferably have unique names with increasing numerical value. Next the server 106 creates a metadata directory 404 for the image added in step 904. The server 106 then stores metadata relating to that particular image in the metadata directory 404 for the image. The server 106 then creates and updates the log 418 in the metadata directory 404 for the image. Next, the method determines 912 whether there are more images that need to be added to the compound document 400. If so, the method returns to step 904 and perform steps 904 through 912 for the next image. If there are no additional images to be added to the compound document 400, the method proceeds to step 914. In step 914, the method creates a directory for the document metadata 406. Then the method completes creation of the compound document by storing metadata in the document metadata directory 406.

Figure 10:
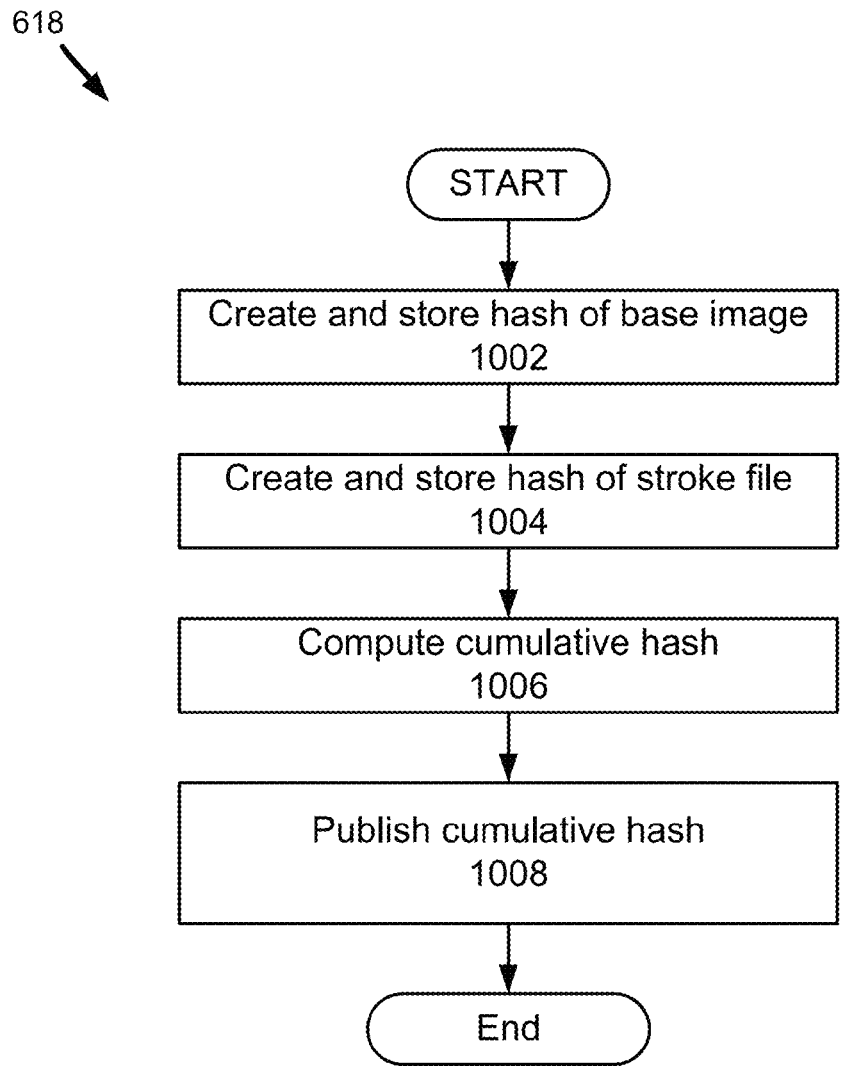
FIG. 10 is a flowchart of an embodiment of a method for logging processing of a document in accordance with the present invention.

Referring now to FIG. 10, an embodiment of a method for logging processing of a document in accordance with the present invention. This method of logging may be performed either by the logging module 314 for creating a local log at the portable computing device 102 or by the logging module 516 for creating a global log at the server 106 or preferably both. Since the methods whether performed at the server 106 or the portable computing device 102 are similar, the method will be described in the context of creating or updating a log at the server 106. The method begins after a formatted message including a compound document 400 has been received. The server 106 creates and stores 1002 a one or more hash values of the base images from the compound document. Next, the server 106 creates and stores 1004 one or more hash values of the stroke files. Then the server 106 computes 1006 a cumulative hash value for the entire document. This process has been described above with respect to logging. Finally, the server 106 publishes 1008 the cumulative hash at a location that is publicly accessible to any parties that want to confirm the processing of the compound document 400. In one embodiment, the data created by this logging function is stored in the memory 504 of the server 106. In another embodiment, the data is stored in the data storage 110 coupled to the server 106. In one embodiment, this cumulative hash is published to a service with independent control from the owner of the computing pads 202 and image and workflow servers 106.

Figure 11:
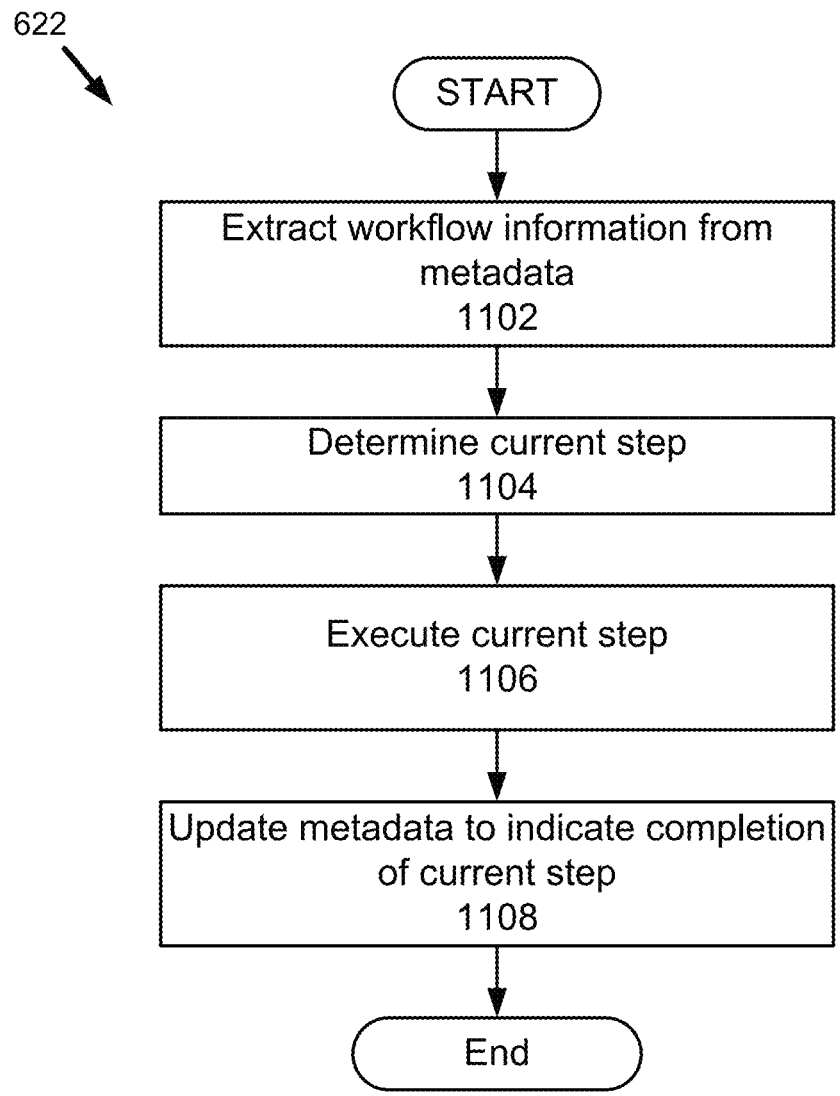
FIG. 11 is a flow chart of an embodiment of a method for determining document routing of a compound document in accordance with the present invention.

Referring now to FIG. 11, an embodiment of a method for determining document routing of a compound document 400 is described. The method begins by extracting 1102 workflow information from the metadata. Examples of such workflow information such as in e-mail headers etc. has been described above with reference to the workflow specification. Next, the method determines 1104 the current step. For linear workflows this can be determined using the recipient's e-mail address. Other methods for determining the current step have been described above with regard to the workflow specification. Then the method executes 1106 the current step. Finally, the method updates 1108 the metadata to indicate completion of the current step. Again, updating techniques have been described above with reference to the workflow service.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for implementing paper-like workflow of a compound document, the method comprising:
   receiving a first formatted message comprising the compound document, the compound document having a first page that is stored as a first page image, first page metadata, a second page that is stored as a second page image, second page metadata and document metadata that includes changes made to the compound document as a whole;
   extracting the compound document from the first formatted message;
   providing for display of the first page image of the compound document;
   capturing one or more input strokes associated with the first page image and timing information describing a time when the one or more input strokes are inputted;
   adding a log entry to the first page metadata, the log entry including data describing the one or more input strokes and the timing information associated with each input stroke;
   creating a second formatted message including the compound document;
   sending the second formatted message; and
   storing the one or more input strokes and a digital signature used to sign the stroke file as a separate stroke file that is part of the first page metadata and wherein the data describing the one or more input strokes in the log entry comprises a content based identifier for the stroke file.

2. The method of claim 1, wherein the first formatted message is an email message having the compound document as an attachment.

3. The method of claim 1, wherein extracting the compound document from the first formatted message includes extracting workflow routing information from an email header.

4. The method of claim 1, further comprising storing an original image of the one or more input strokes in a raster format and storing symbolic stroke information.

5. The method of claim 1, further comprising:
   extracting workflow information from the metadata;
   determining a current step; and
   executing the current step.

6. The method of claim 5, further comprising updating the metadata to indicate completion of the current step.

7. The method of claim 1, further comprising adding the content based identifier for the log entry to the document metadata in the compound document.

8. The method of claim 7, wherein the content based identifier comprises a cryptographic hash of the one or more input strokes and previous log entries.

9. The method of claim 1, further comprising reordering the first and second page images based on the document metadata.

10. The method of claim 1, wherein the steps are performed by a portable computing device.

11. The method of claim 1, comprising creating an entangled local log that includes changes to a plurality of compound documents by a particular computing device.

12. The method of claim 1, wherein sending the second formatted message includes determining a routing for the second formatted message by automatically extracting workflow routing information from the first formatted message and using the workflow routing information to generate an addressee for the second formatted message.

13. The method of claim 1, wherein the steps are performed by a portable computing device having a unique identifier, and wherein the compound document includes the first and second page images stored in an encrypted format and extracting the compound document includes decrypting the first and second page images of the compound document using a private key.

14. The method of claim 1, further comprising transmitting the one or more input strokes in an intermediate formatted message.

15. A system for implementing paper-like workflow of a compound document, the system comprising:
one or more processors;
a document transfer module stored on a memory and executable by the one or more processors, the document transfer module configured to receive a first formatted message comprising the compound document, the compound document having a first page that is stored as a first page image, first page metadata, a second page that is stored as a second page image, second page metadata and document metadata that includes changes made to the compound document as a whole, extract the compound document from the first formatted message, create a second formatted message including the compound document and send the second formatted message;
a presentation module stored on the memory and executable by the one or more processors, the presentation module coupled to the document transfer module and configured to provide for display of the first page image of the compound document;
a stroke capture module stored on the memory and executable by the one or more processors, the stroke capture module coupled to the document transfer module and configured to capture one or more input strokes associated with the first page image and timing information describing a time when the one or more input strokes are inputted; and
a logging module stored on the memory and executable by the one or more processors, the logging module coupled to the document transfer module and configured to add a log entry to the first page metadata, the log entry including data describing the one or more input strokes and the timing information associated with each input stroke.

16. The system of claim 15, wherein the logging module extracts workflow information from the metadata, determines a current step and executes the current step.

17. The system of claim 15, further comprising a routing module coupled to the document transfer module, the routing module configured to determine a routing for the second formatted message by automatically extracting workflow routing information from the first formatted message and using the workflow routing information to generate an addressee for the second formatted message.

18. The system of claim 15, wherein the logging module adds the content based identifier for the log entry to the document metadata in the compound document.

19. The system of claim 15, wherein the first formatted message is an email message having the compound document as an attachment.

20. A computer program product comprising a non-transitory computer useable medium including a computer readable program, wherein the computer readable program when executed on a computer causes the computer to:
receive a first formatted message comprising a compound document, the compound document having a first page that is stored as a first page image, first page metadata, a second page that is stored as a second page image, second page metadata and document metadata that includes changes made to the compound document as a whole;
extract the compound document from the first formatted message;
provide for display of the first page image of the compound document;
capture one or more input strokes associated with the first page image and timing information describing a time when the one or more input strokes are inputted;
add a log entry to the first page metadata, the log entry including data describing the one or more input strokes and the timing information associated with each input stroke;
create a second formatted message including the compound document;
send the second formatted message; and
store the one or more input strokes and a digital signature used to sign the stroke file as a separate stroke file that is part of the first page metadata and wherein the data describing the one or more input strokes in the log entry comprises a content based identifier for the stroke file.

* * * * *